3,043,701
METHOD FOR PRODUCING A BAKED CREAM PIE AND THE RESULTING PRODUCT
Duane E. Wickersham, 329 E. South St., Winchester, Ind.
No Drawing. Filed May 24, 1960, Ser. No. 31,268
3 Claims. (Cl. 99—92)

This invention relates to a filling and a method for making same. In particular, this invention relates to a sugar cream pie filling composition and an improved method for producing such a filling.

When fillings were originally prepared for use in pies or as fillings in pastries, such as puffs, the material employed was usually whipped cream. There are a number of disadvantages in the employment of whipped cream in such filling compositions, one of which is, of course, the fact that the whipped cream gradually breaks down releasing the air that was previously incorporated therein, leaving as a result a watery mass which produces a soggy pastry after only a relatively short period of time. One more disadvantage in the use of whipped cream is the fact that its keeping qualities or shelf life is particularly short so that a food product which includes whipped cream must be sold almost immediately for satisfactory use. Another disadvantage is in the fact that it is impossible to incorporate a whipped cream filling in pastry that is to be subjected to a baking step. Additionally, in order to produce whipped cream, an extremely heavy cream must be employed which oftentimes is not readily available during various seasons of the year.

The present invention overcomes many of the disadvantages found in connection with the use of whipped cream and other fillings of the same type. The sugar cream filling to be disclosed herein may be easily manufactured in large commercial establishments so that the efficiencies attendant such manufacturing facilities may be obtained. Additionally, the ingredients employed in the filling are readily available throughout all the seasons of the year insuring a filling that is consistent in texture at all times.

Accordingly, it is a primary object of the present invention to disclose an improved cream filling.

It is another object of the present invention to disclose a cream filling having unusual texture characteritsics.

It is yet a further object of the present invention to disclose a cream filling which produces a novel crust on pies having no dough crusts on their upper surfaces thereof.

It is still a further object of the present invention to disclose a method for producing a novel cream filling composition which produces results which are easily reproducible.

Additional objects and advantages will become apparent after a consideration of the following detailed discussion of the present invention.

The cream pie filling includes a high butter fat content in order to produce as creamy a textured filling as possible. The method for producing the filling is to take a quantity of butter which is cut or sliced into a quantity of all purpose flour until the mixture becomes smooth. Flavoring ingredients such as salt and nutmeg may then be incorporated therein. The next step is to incorporate a quantity of milk, which is preferably fresh whole milk, into the butter-flour mixture. It has been discovered that conventional milk pasteurizer may be employed to incorporate the solid butter-flour mixture into the milk. This is accomplished by filling the pasteurizer with a quantity of milk and circulating the milk from the pasteurizer reservoir through a pipeline into which the butter-flour mixture is admitted through a suitably positioned funnel. The milk, carrying a portion of the butter-flour mixture, is then circulated back into the reservoir of the pasteurizer. In this manner, the butter-flour mixture is gradually mixed into the milk. The resultant is a fluid mixture having globules of solid butter therein. The butter particles are modified in that they have absorbed on their surfaces a small quantity of flour. In order to sweeten the resultant mixture, a relatively large quantity of sugar is added thereto and stirred until the sugar has become solubilized therein. In order to bring up the butter fat content of the resultant to a desirable creamy level, a relatively large quantity of sweet cream is added having a 40 percent butter fat content. At the conclusion of the addition of the sweet cream, another flavoring material may be added, such as vanilla.

The resultant concoction is stored for a period of time to permit any air bubbles to rise to the surface which may have been incorporated during the various mixing steps. It has been discovered that such a procedure is advisable rather than to permit the air bubbles to agglomerate producing a less solid filling.

The filling, after it has been stored, can be utilized by filling unbaked pie shells. The filled pie shell is then placed in a preheated oven at 400° F. and permitted to bake at this temperature for 25 minutes. The temperature of the oven is then reduced to 375° F. and baked for an additional 45 minutes. Thereafter the pie may be removed from the oven and permitted to cool.

As a result of the baking step, a novel upper crust is produced on the filling which is due to the heat of the oven acting on the filling. The novel crust is possible by virtue of the fact that the butter globules or butter particles have risen to the surface carrying with them the absorbed flour. It is this particular feature of the present invention that enables the production of a pie which does not have the ordinary dough pie crust on the upper surface, yet has an excellent crusty upper layer produced from the filling itself which solidly seals the rest of the filling thereby preventing early deterioration of the filling.

The following example sets forth the exact quantities that may be employed in order to produce the filling of the present invention. The quantities set forth therein, however, may be varied; therefore, the example is merely illustrative of the invention and is not to be construed as placing limitations on the scope other than as set forth in the appended claims.

Example

| Ingredient | Amount |
| --- | --- |
| Granulated pure cane sugar | lbs__ 84 |
| Pasteurized sweet cream (40% butter fat) | gals__ 10 |
| Whole milk | gals__ 10 |
| All purpose flour | lbs__ 19 |
| Butter | lbs__ 6 |
| Nutmeg | oz__ 2 |
| Salt | oz__ 2 |
| Vanilla extract | oz__ 4 |

The 6 lbs. of butter was gradually cut into the 19 lbs. of flour until it produces a smooth texture. The salt and nutmeg were then added. This dry mixture of butter, flour, salt and nutmeg was then slowly added to the 10 gallons of whole milk. This was accomplished in the manner discussed in the above. Thereafter the 84 lbs. of sugar was added to the milk mixture containing the dry mix and mixed thoroughly. To the resultant, the 10 gallons of sweet cream was added in a manner to effect mixing thereof. At the conclusion, the vanilla extract was stirred into the mixture. The resulting filling was stored under refrigeration for approximately 6 hours in order to permit any air bubbles to rise to the surface, thereby producing a more solid filling. At the end of this period, the filling was ready for use as either a pie filling or as a filling in other types of pastry.

It has been discovered that the filling should not be stored for a period of time longer than 36 hours since the raw cream therein becomes heavier as it ages which will cause it to separate when stirred. The texture of the finished pie would then become too solid if the cream becomes too old. Since it is an object of this invention to produce a creamy pie filling, overaging is therefore to be avoided.

The foregoing is considered as illustrative only of the principles of the invention. Further, since numerous modifications and changes will readily occur to those skilled in the art, it is not desired to limit the invention to the exact composition and method for producing same as described, and accordingly all suitable variations and equivalents may be restored to, falling within the scope of the invention as claimed.

What is claimed as new is as follows:

1. A method for producing a baked cream pie which comprises mixing a quantity of butter in discrete particles into a quantity of flour whereby a quantity of the flour becomes absorbed on the particles of butter, incorporating the mixture into a quantity of milk, adding sugar, admixing a quantity of sweet cream having a butterfat content of 40% into the resultant mixture, holding the thereby produced mixture in a quiescent state to permit the release of entrapped air bubbles incorporated therein during the mixing steps, filling an unbaked formed pie crust and thereafter baking the pie crust together with the filling.

2. A method for producing a baked cream pie which comprises slicing approximately six pounds of butter into approximately nineteen pounds of flour, mixing the butter and flour mixture whereby a quantity of the flour becomes absorbed on the particles of butter, incorporating the resultant mixture into approximately ten gallons of whole milk, adding approximately eighty-four pounds of sugar, then admixing approximately ten gallons of sweet cream having a butterfat content of 40% into the mixture, holding the thereby produced mixture in a quiescent state to permit the release of entrapped air bubbles incorporated therein during the mixing steps, filling an unbaked formed pie crust with the said mixture and thereafter baking the filling and pie crust together.

3. The product produced according to the method of claim 1.

References Cited in the file of this patent

"Everybody's Cookbook," by Lord. Henry Holt and Company, New York, 1924, pages 437 and 438.